(12) United States Patent
Akutsu

(10) Patent No.: US 8,661,514 B2
(45) Date of Patent: Feb. 25, 2014

(54) INFORMATION PROCESSING DEVICE, INFORMATION PROCESSING METHOD, AND PROGRAM

(75) Inventor: Toru Akutsu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 582 days.

(21) Appl. No.: 12/640,484

(22) Filed: Dec. 17, 2009

(65) Prior Publication Data

US 2010/0211991 A1 Aug. 19, 2010

(30) Foreign Application Priority Data

Feb. 17, 2009 (JP) ................................ 2009-034263

(51) Int. Cl.
- *G06F 15/16* (2006.01)
- *H04L 29/06* (2006.01)
- *G06F 12/00* (2006.01)
- *G06F 21/00* (2013.01)

(52) U.S. Cl.
USPC ................. 726/7; 726/17; 713/182; 713/184; 705/51

(58) Field of Classification Search
USPC .......... 713/168–174, 182–186, 202; 726/2–8; 709/225, 229
See application file for complete search history.

(56) References Cited

U.S. PATENT DOCUMENTS

| 2005/0108549 | A1* | 5/2005 | Kanai ........................... 713/182 |
| 2007/0028100 | A1 | 2/2007 | Sato |
| 2007/0234063 | A1* | 10/2007 | Ueda et al. ..................... 713/183 |
| 2009/0027724 | A1 | 1/2009 | Nagase et al. |
| 2009/0063181 | A1* | 3/2009 | Nho et al. ......................... 705/1 |

FOREIGN PATENT DOCUMENTS

| JP | 11-134451 | 5/1999 |
| JP | 2003-256787 | 9/2003 |
| JP | 2007-36701 A | 2/2007 |
| JP | 2008-97586 | 4/2008 |
| JP | 2008-197824 A | 8/2008 |

OTHER PUBLICATIONS

Office Action issued on Feb. 26, 2013, in Japanese patent Application No. 2009-034263.

* cited by examiner

*Primary Examiner* — Evans Desrosiers
(74) *Attorney, Agent, or Firm* — Oblon, Spivak, McClelland, Maier & Neustadt, L.L.P.

(57) ABSTRACT

An information processing device including a flow definition memory unit configured to store flow definition information in which a process flow of image data read by an image reading unit is defined, and an authentication screen generating unit configured to determine plural processing units that execute a part of the process flow based on the flow definition information, acquire item information indicative of items of authentication information corresponding to a part or all of the plural processing units which require authentication from the part or all of the plural processing units which require the authentication, and generate authentication screen definition information used for displaying an authentication screen integrating and showing the item information.

12 Claims, 19 Drawing Sheets

FIG.7

```
<?xml version="1.0"?>                                              180
<Distribution>
    <ID>TEST FLOW</ID>                    181
    //DESCRIBING IMAGE CONVERSION PROCESS              182
    <Plugin>
        <PluginID>ImageConverter</PluginID>
        <PluginType>Filter</PluginType>
        <Parameters>
            <FileFormat>PDF</FileFormat>
        </Parameters>
        <Next>
            //DESCRIBING FOLDER DELIVERY PROCESS EXECUTED
                AFTER IMAGE CONVERSION PROCESS         184
            <Plugin>
                <PluginID>ToFolder</PluginID>
                <PluginType>Output</PluginType>
                <required>false</required>
                <Parameters>
                    <Destinations>
                        <Path>xxxxxxxxxx</Path>
                    </Destinations>
                </Parameters>
            </Plugin>
        </Next>
    </Plugin>
    //DESCRIBING E-mail PROCESS EXECUTED IN PARALLEL    183
    <Plugin>
        <PluginID>ToEmail</PluginID>
        <PluginType>Output</PluginType>
        <required>true</required>
        <Parameters>
            <SmtpServer>111.111.111.111</SmtpServer>
            <Sender>abc@xxx.yyy.com</Sender>
            <Subject>xxxx</Subject>
            <Body>xxxx</Body>
            <Destinations>
                <Address>dest1@xxx.yyy.com</Address>
                <Address>dest2@xxx.yyy.com</Address>
            </Destinations>
        </Parameters>
    </Plugin>
</Distribution>
```

FIG.8

```
<?xml version='1.0' encoding='UTF-8' ?>
<LoginFields>
    <!-- Option1 -->
    <Label id="option1_label" label="Option1" />
    <EditBox id="option1" required="true" >
        <parameterID>option1</parameterID>
    </EditBox>
    <!-- Option2 -->
    <Label id="option2_label" label="Option2" />
    <EditBox id="option2" required="false" >
        <parameterID>option2</parameterID>
        <value>preset</value>
    </EditBox>
</LoginFields>
```

```xml
<?xml version='1.0' encoding='UTF-8' ?>
<LoginFields>
    <!-- Option3 -->
    <Label id="option3_label" label="Option3" />
    <ComboBox id="option3" required="true" viewableitemNum="2">
        <parameterID>option3</parameterID>
        <Data selectedIndex="0">
            <item id="option3_item1" label="abc">
                <value>abc</value>
            </item>
            <item id="option3_item2" label="def">
                <value>def</value>
            </item>
        </Data>
    </ComboBox>

<!-- Option4 -->
    <Label id="option4_label" label="Option4" />
    <EditBox id="option4" required="false" title="Option4">
        <parameterID>option4</parameterID>
        <value>preset</value>
    </EditBox>
</LoginFields>
```

```xml
<?xml version='1.0' encoding='UTF-8' ?>
<window type="Window" id="xxxx" x="8" y="8" width="784" height="428" >
    <part type="Label" id="Title" x="76" y="40" width="648" height="58" label="PLEASE INPUT AUTHENTICATION INFORMATION." />
    <part type="Button" id="cancel" x="68" y="364" width="152" height="34" label="CANCEL">
        <action id="onClick">
            <invokeMethod className="xxxx" methodName="xxxx" parameters="xxxx" />
        </action>
    </part>
    <part type="Button" id="login_button" x="564" y="364" width="152" height="34" label="LOGIN">
        <action id="onClick">
            <invokeMethod className="xxxx" methodName="xxxx" parameters="xxxx" />
        </action>
    </part>
    <part type="Label" id="user_name_label" x="0" y="-25" width="180" height="34" label="USER NAME" />
    <part width="300" type="EditBox" required="false" title="USER NAME" id="user_name" height="34" enabled="true" y="-25" x="180" >
        <parameterID>user_name</parameterID>
    </part>
    <part type="Label" id="password_label" x="0" y="34" width="180" height="34" label="PASSWORD" />
    <part type="EditBox" id="password" required="false" x="180" y="34" width="300" height="34" >
        <parameterID>password</parameterID>
    </part>
</window>
```

FIG.12

```
<part type="Label" id="option1_label" x="0" y="-25" width="180" height="34" label=" Option1" />       ~1903
<part type="EditBox" id="option1" required="false" x="180" y="-25" width="300" height="34" >          ~1923
  <parameterID>option1</parameterID>
</part>
<part type="Label" id="option2_label" x="0" y="34" width="180" height="34" label=" Option2" />        ~1904
<part width="300" type="EditBox" id="option2" required="false" x="180" y="34" x="180" >               ~1924
  <parameterID>option2</parameterID>
  <value>preset</value>
</part>
<part type="Label" id="option3_label x="0" y="93" width="180" height="34" label=" Option3" />         ~1905, ~1925
<part type="ComboBox" id="option3" required="false" x="180" y="93" width="300" height="34" viewableitemNum="2" >
  <parameterID>option3</parameterID>
  <item id="option3_item1" label=" abc" >
    <value>abc</value>
  </item>
  <item id="option3_item2" label=" def" >
    <value>def</value>
  </item>
</part>
<part type="Label" id="option4_label" x="0" y="152" width="180" height="34" label=" Option4" />       ~1906
<part type="EditBox" id="option4" required="false" x="180" y="152" width="300" height="34" >          ~1926
  <parameterID>option4</parameterID>
  <value>preset</value>
</part>
</window>
<authentication>                                                                                       ~1950
  <plugin id="authA" required="false" />                                                               ~1951
  <plugin id="authB" required="true" />                                                                ~1952
</authentication>
```

190

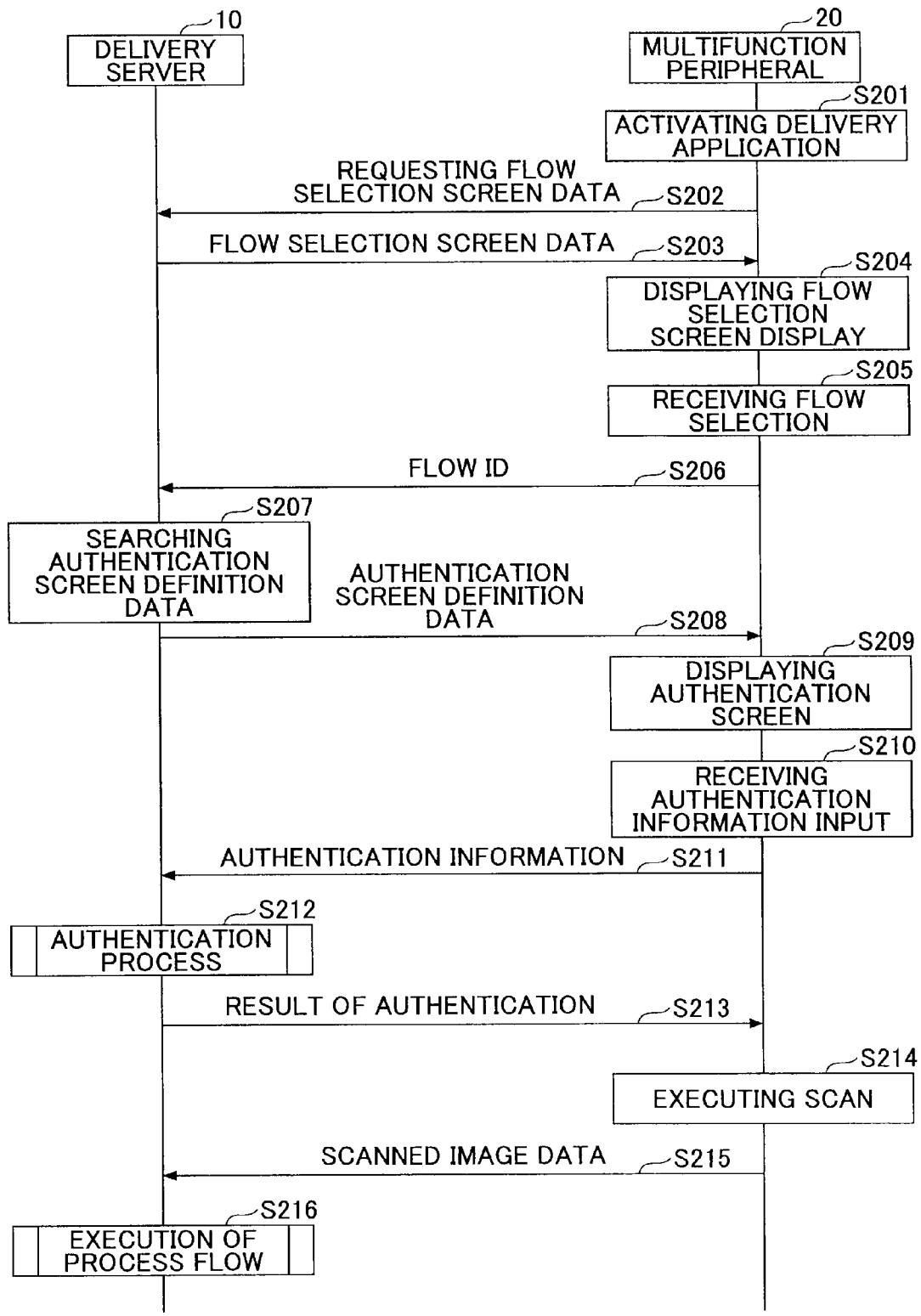

FIG.15

| AUTHENTICATION INFORMATION ITEM ID | INPUT VALUE |
|---|---|
| USER NAME | xxxx |
| PASSWORD | xxxx |
| Option1 | xxxxx |
| Option2 | xxxx |
| Option3 | xxxx |
| Option4 | xxxxx |

INFORMATION PROCESSING DEVICE, INFORMATION PROCESSING METHOD, AND PROGRAM

BACKGROUND OF THE INVENTION

1. Field of the Invention

The present invention generally relates to an information processing device, an information processing method, and a program, and more specifically, to a an information processing device, an information processing method, and a program which carry out a process flow constructed by combining plural software components.

2. Description of the Related Art

Interfaces of software programs for recent image forming apparatuses have been opened to the public. Therefore, it is possible to enhance functions of the software programs using a software program developed by a party other than manufacturers of the image forming apparatuses. With such an enhancement of function, it becomes possible to associate a user's business system with the image forming apparatus, thereby enhancing a degree of compatibility between the user's business system and the image forming apparatus.

As an example of collaboration between an image forming apparatus and business system, a network delivery system can be mentioned. The network delivery system delivers image data scanned by the image forming device into a predetermined computer. For example, in Patent Document 1, there is disclosed a network delivery system which can construct a sequential flow of a delivery process by arbitrarily combining a processing unit or plural processing units. With the technique disclosed in Patent Document 1, it is possible to concisely construct a delivery flow suitable for a business flow of a user by changing the combination of the processing units.

It is possible to open an interface for implementing the processing units to the public, to thereby enable modifying of the processing unit as a plug-in. By implementing each of the plug-ins when necessary, it is possible to enhance a degree of compatibility with the business flow of the user.

When the processing unit is installed with the plug-in, it is also possible to restrict use of the plug-in user by user. One example of the restricted use is to permit only a predetermined user to use a certain plug-in. In this case, an authentication process is necessary when the plug-in is started. Further, even though the restricted use is not provided in the plug-in, authentication may be required in a process carried out during operation of the plug-in. For example, authentication on a communication protocol used for a delivery process may be required during plug-in of carrying out the delivery process. In this case also, an authentication process is necessary when the plug-in is started.

In consideration of enhancement of degree of freedom and eventually enhancement of scalability of a network delivery system, it is preferable that each plug-in has its own authentication information requirements that is determined by itself.

However, there is a problem of a cumbersome procedure for the user to be required to input pieces of authentication information one after another to authentication screens, which are displayed in correspondence with a plug-in carrying out every step of a delivery flow as the steps advance. An extreme example of the problem is that the user cannot leave a place where the delivery flow is instructed in order to input the authentication information until a last step of the delivery flow is completed.

[Patent Document 1]

Japanese Unexamined Patent Application Publication No. 2008-97586

SUMMARY OF THE INVENTION

Accordingly, the embodiment of the present invention provides a novel and useful information processing device, information processing method, and program, which can simplify input operation of authentication information related to a process flow, constructed in combination with plural software components.

One aspect of the embodiment of the present invention may be to provide an information processing device including a flow definition memory unit configured to store flow definition information in which a process flow of image data read by an image reading unit is defined, and an authentication screen generating unit configured to determine plural processing units that execute a part of the process flow based on the flow definition information, acquire item information indicative of items of authentication information corresponding to a part or all of the plural processing units which require authentication from the part or all of the plural processing units which require the authentication, and generating authentication screen definition information used for displaying an authentication screen integrating and showing the item information.

Additional objects and advantages of the embodiment will be set forth in part in the description which follows, and in part will be obvious from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 7 illustrates an example of flow definition data.

FIG. 8 illustrates an example of plug-in authentication screen data corresponding to image conversion plug-in in the Embodiment, as an example.

FIG. 9 illustrates an example of plug-in authentication screen data corresponding to folder delivery plug-in in the Embodiment, as an example.

FIG. 11 illustrates an example of authentication screen definition data in the Embodiment.

FIG. 12 illustrates an example of the authentication screen definition data in the Embodiment.

FIG. 13 is a sequence diagram explaining a procedure of executing a process flow.

FIG. 15 illustrates a structural example of authentication information.

FIG. 18 illustrates specific examples of the integrative result of the authentication.

DETAILED DESCRIPTION OF THE PREFERRED EMBODIMENTS

A description is given below, with reference to the FIG. 1 through FIG. 19 of the Embodiment of the present invention.

In the Embodiment, reference signs typically designate as follows: 1: network delivery system; 10: delivery server; 11: filter plug-in; 12: output plug-in; 13: authentication plug-in; 14: flow process controlling unit; 15: authentication controlling unit; 16: flow definition generating unit; 17: authentication screen generating unit; 18: flow selection screen generating unit; 20: multifunction peripheral (MFP); 21: controller; 22: scanner; 23: printer; 24: modem; 25: operation panel; 26: network interface card; 27: SD card slot; 30: file server; 40: Web server; 50: SMTP server; 100: drive device; 101: recording medium; 102: auxiliary storage device; 103: memory device; 104: CPU; 105: interface device; 106: display device; 107: input device; 111: image conversion plug-in; 121: WEB delivery plug-in; 122: folder delivery plug-in; 123: mail delivery plug-in; 124: FTP delivery plug-in; 180: flow definition data; 190: authentication screen definition data; 211: CPU; 212: RAM; 213: ROM; 214: HDD; and B: bus.

Figure 1:
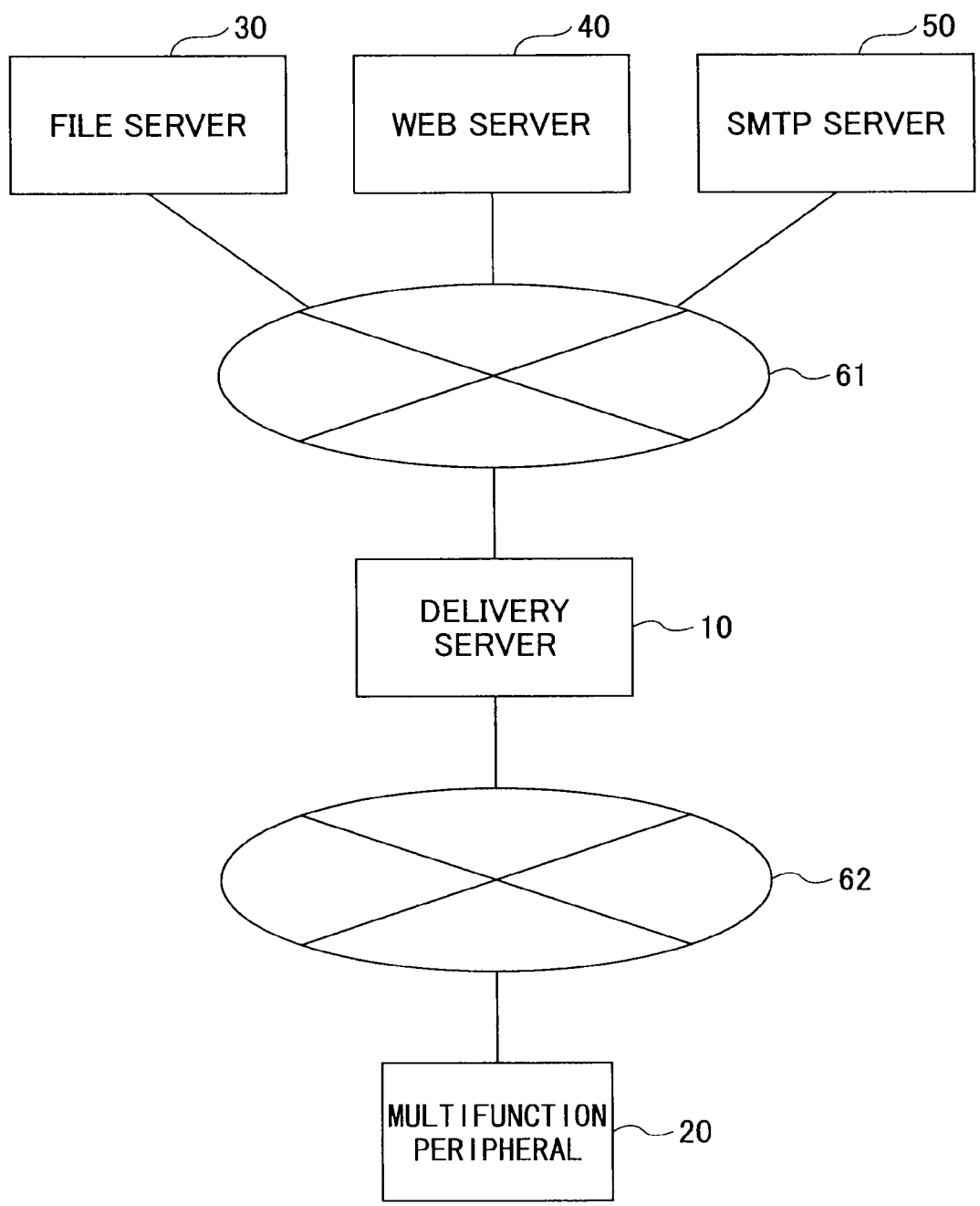
FIG. 1 illustrates a network delivery system configuration according to an Embodiment of the present invention, as an example.

FIG. 1 illustrates a network delivery system configuration according to Embodiment of the present invention, as an example. In FIG. 1, the network delivery system 1 has a delivery server 10, a multifunction peripheral (MFP) 20, a file server 30, a Web server 40, a Simple Mail Transfer Protocol (SMTP) server 50, or the like. The delivery server 10, the multifunction peripheral (MFP) 20, the file server 30, the web server 40, and the Simple Mail Transfer Protocol (SMTP) server 50 are connected via a network 61 (regardless of wired or wireless) such as the Internet. The delivery server 10 and the multifunction peripheral (MFP) 20 are connected via a network 62 (regardless of wired or wireless) such as a LAN and the Internet.

The multifunction peripheral (MFP) 20 is an image forming apparatus configured to install a scan function, a copy function, a printer function, and a facsimile function. The multifunction peripheral (MFP) 20 produces image data by scanning a paper medium or the like with the scanner function, and sends the produced image data to the delivery server 10. Although, in the Embodiment, application of the multifunction peripheral (MFP) is exemplified, any device such as a scanner, a fax machine and a copy machine is applicable.

The delivery server 10 is a computer such as a personal computer (PC) and a workstation, which receives image data scanned by the multifunction peripheral 20 and carries out various processes and delivery processes in conformity with flow definition data described below.

The file server 30 is a computer which accumulates files commonly owned on the network 61 and administrates the files. The web server 40 is a so-called Web server. The SMTP server 50 carries out a transmission process of an electric mail in conformity with a Simple Mail Transfer Protocol (SMTP), which is a protocol used when e-mails are sent. The file server 30, the web server 40, and the SMTP server 50 are positioned as a destination of delivery in a delivery process with the delivery server 10.

Figure 2:
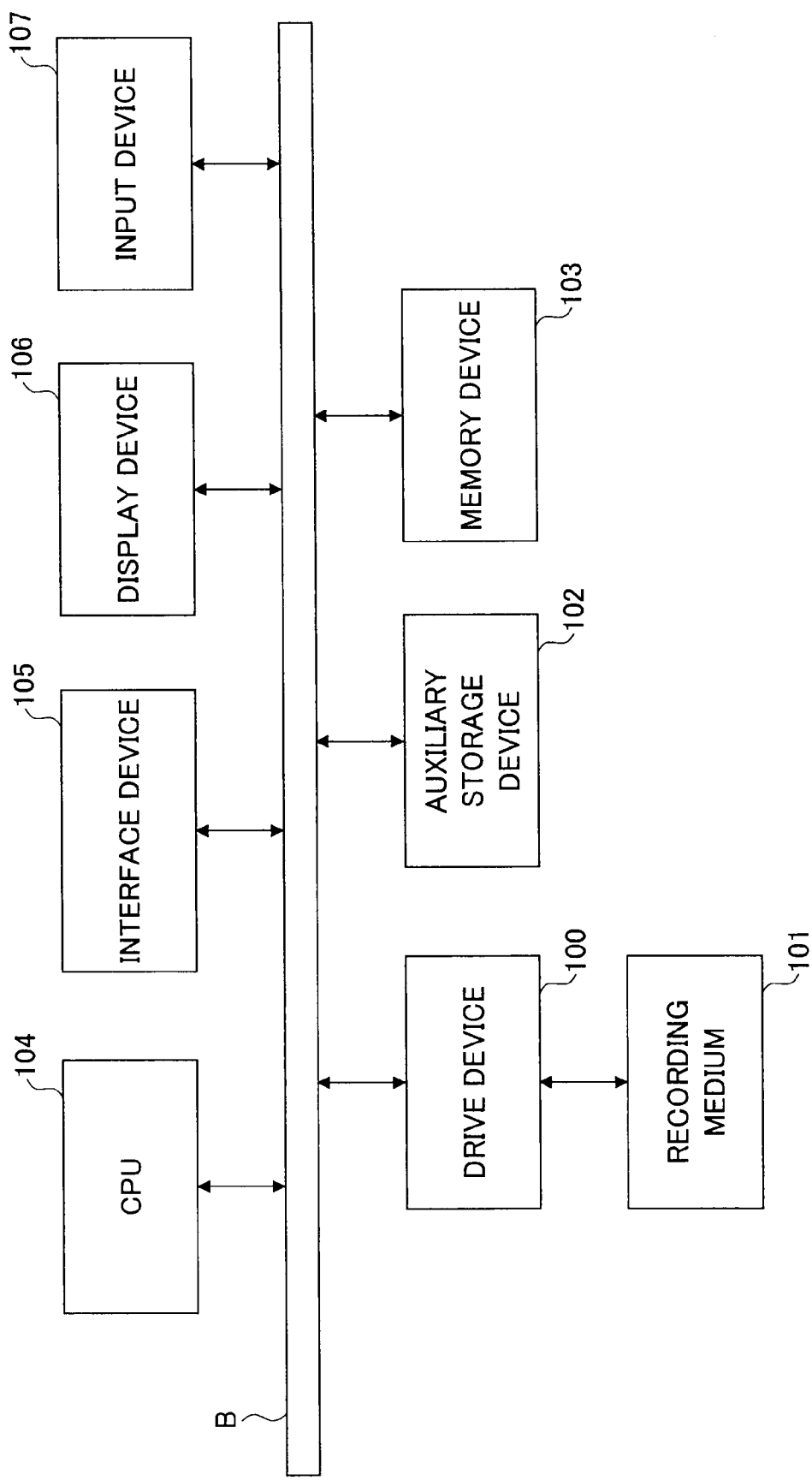
FIG. 2 illustrates a hardware configuration of a delivery server according to the Embodiment of the present invention, as an example.

Next, the delivery server 10 is described in detail. FIG. 2 illustrates a hardware configuration of the delivery server according to the Embodiment of the present invention. The delivery server 10 in FIG. 2 includes a drive device 100, an auxiliary storage device 102, a memory device 103, a CPU 104, an interface device 105, a display device 106, and an input device 107, which are mutually connected by a bus B.

A program realizing processes in the delivery server 10 is supplied by a recording medium such as CD-ROM. When the recording medium 101 with the program recorded on it is installed in the driving device 100, the program is installed in the auxiliary storage device 102 via the drive device 100. However, the program needs not to be always installed from the recording medium 101 and may be downloaded from another computer via the network. The auxiliary storage device 102 stores necessary files, data and so on in addition to the installed program.

The memory device 103 reads out the program from the auxiliary storage device 102 when it is instructed to invoke the program and stores the program in the memory device 103. The CPU 104 realizes a function related to the delivery server 10 in conformity with the program stored in the memory device 103. The interface device 105 is used as an interface for connecting the delivery server to the network. The display unit 106 displays a Graphical User Interface (GUI) or the like with the program. The input unit 107 is configured to include a keyboard, a mouse or the like, and is used to input various operational instructions.

Figure 3:
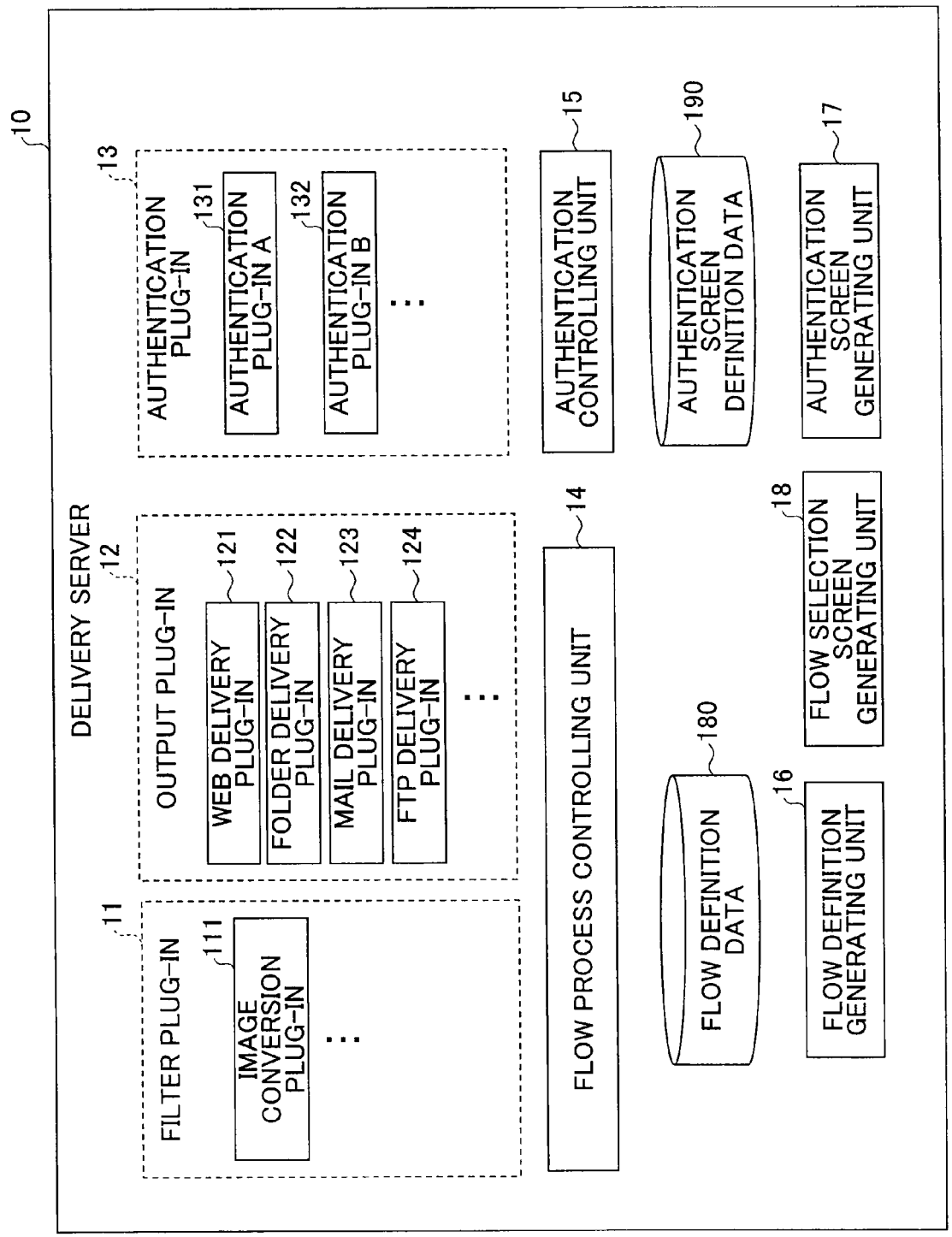
FIG. 3 illustrates a functional structure of the delivery server according to the Embodiment of the present invention, as an example.

FIG. 3 illustrates a functional structure of the delivery server according to the Embodiment of the present invention, as an example. In FIG. 3, the delivery server 10 includes a filter plug-in 11, an output plug-in 12, an authentication plug-in 13, a flow process controlling unit 14, an authentication controlling unit 15, a flow definition generating unit 16, an authentication screen generating unit 17, a flow selection screen generating unit 18, flow definition data 180, authentication screen definition data 190 and so on.

The flow definition data 180 are input via the multifunction peripheral 20 when the flow definition data 180 are scanned by the multifunction peripheral 20. The flow definition data 180 define a process flow carried out for delivering the image data received from the multifunction peripheral 20.

The filter plug-in 11 and the output plug-in 12 are software components which carry out a part or all of processes (steps) forming the process flow. The filter plug-in 11 carries out an intermediate process including the delivery such as a conversion process for the image data. The output plug-in 12 carries out the delivery process (output process). In the Embodiment, the process flow is defined by inserting the filter plug-in 11 or the output plug-in 12 in a process sequence.

In FIG. 3, an image conversion plug-in 111 is exemplified as the filter plug-in 11. The image conversion plug-in 111 converts the image data of a predetermined format (e.g. Tagged Image File Format: TIFF) to another predetermined format (e.g. PDF format).

Further, a web delivery plug-in 121, a folder delivery plug-in 122, a mail delivery plug-in 123, and a FTP delivery plug-in 124 are exemplified as the output plug-in 12. The web delivery plug-in 121 delivers data input in the web delivery plug-in 121 itself to the web server 40 with Web-based Distributed Authoring and Versioning (WebDAV). The folder delivery plug-in 122 delivers data input to the folder delivery plug-in 122 itself to a predetermined folder in a file system of the file server 30. The mail delivery plug-in 123 delivers data input to the mail delivery plug-in 123 itself to a predetermined mail address via the SMTP server 50. The FTP delivery plug-in 124 delivers data input to the FTP delivery plug-in 124 itself to the file server 30 and so on with a File Transfer Protocol (FTP).

The flow process controlling unit 14 controls execution of the process flow in compliance with a content defined by the flow definition data 180. The flow process controlling unit 14 causes the filter plug-in 11 or the output plug-in 12 to execute the process in an order defined by the flow definition data 180.

The flow definition generating unit 16 generates or edits the flow definition data 16 in accordance with an instruction input by the user.

The flow selection screen generating unit 18 generates definition data (e.g. flow selection screen data) of a screen (e.g. flow selection screen) for selecting a process flow to be executed.

The authentication screen definition data 190 are data which define configuration information of an authentication screen used for authenticating the user before starting the process flow.

The authentication plug-in 13 is a software component which carries out the authentication process based on the authentication information input to the authentication screen. In FIG. 3, an authentication plug-in A 131 and an authentication plug-in B 132 are exemplified as the authentication plug-in 13.

What authentication process is carried out by each of the authentication plug-ins 13 using any parameter (hereinafter, referred to as authentication information item) forming the authentication information depends on implementation of the each of the authentication plug-ins 13.

Each of the authentication plug-ins 13 relate to either the filter plug-in 11 or the output plug-in 12. A result of the authentication with the each authentication plug-in 13 is used as an item an item for determining whether the filter plug-in 11 or the output plug-in 12 is permitted to be used, an item for determining execution of the process flow, or the like. In the Embodiment, the authentication plug-in A 131 is associated with the image conversion plug-in 111, and the authentication plug-in B 132 is associated with the folder delivery plug-in 122. A relation between either the filter plug-in 11 or the output plug-in 12 and the authentication plug-in 13 is administrated by the filter plug-in 11 or the output plug-in 12. Said differently, the filter plug-in 11 or the output plug-in 12 has identification information of the authentication plug-in 13 for determining whether the filter plug-in 11 or the output plug-in 12 is permitted to be used. For example, such an identification information is built in the filter plug-in 11 or the output plug-in 12. Alternatively, a relation between either the filter plug-in 11 or the output plug-in 12 and the authentication plug-in 13 may be defined in editable data such as a file. Here, the filter plug-in 11 and the output plug-in 12 which do not require authentication have no relation with the authentication plug-in 13. Whether the authentication is necessary or not depends on the implementation of each of the filter plug-ins 11 and the output plug-ins 12.

In the Embodiment, the "plug-in" designates a software component which can be arbitrarily added (installed) or deleted (uninstalled). Therefore, the filter plug-in 11, the output plug-in 12 and the authentication plug-in 13 are added to or deleted from the delivery server 10 where necessary. An Application Program Interface (API) used by each plug-in is opened to the public. Therefore, a third vendor can develop various plug-ins. For example, the "API" for the filter plug-in 11 and the output plug-in 12 is an interface associated with the flow process controlling unit 14. Further, the "API" for the authentication plug-in 13 is an interface associated with the authentication controlling unit 15.

The authentication controlling unit 15 controls the entire authentication process. Specifically, the authentication controlling unit 15 causes the each authentication plug-in 13 associated with the filter plug-in 11 or the output plug-in 12 to execute the authentication process, and integrates a response (whether or not the authentication is successful) from the each authentication plug-in 13, thereby determining success of the authentication as a whole. Here, the filter plug-in 11 or the output plug-in 12 is used in the process flow to be executed.

The authentication screen generating unit 17 acquires an authentication information item necessary for determining whether the filter plug-in 11 or the output plug-in 12 is permitted to be used from the filter plug-in 11 or the output plug-in 12, which is subject to use in the process flow defined in the flow definition data 180, and generates the authentication screen definition data 190 based on the acquired information.

Figure 4:
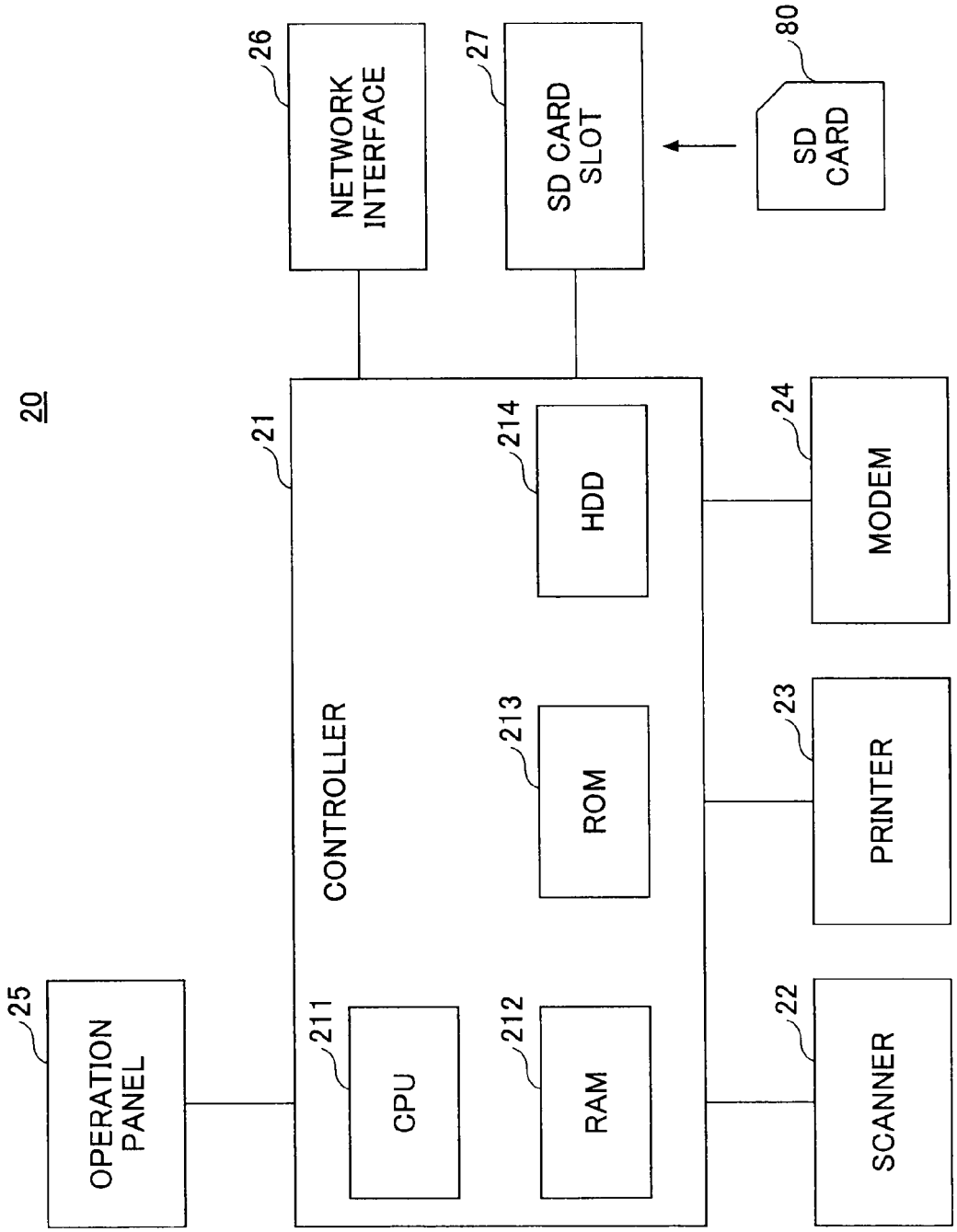
FIG. 4 illustrates a hardware configuration of a multifunction peripheral according to the Embodiment of the present invention, as an example.

Next, a detailed description of the multifunction peripheral is described. FIG. 4 illustrates a hardware configuration of the multifunction peripheral according to the Embodiment of the present invention, as an example.

Referring to FIG. 4, the multifunction peripheral 20 includes hardware such as a controller 21, a scanner 22, a printer 23, a modem 24, an operation panel 25, a network interface card 26, and an SD card slot 27.

The controller 21 includes a CPU 211, a RAM 212, a ROM 213, an HDD 214 or the like. The ROM 213 records various programs, data used by the programs, or the like. The programs are a delivery application for executing a delivery job in association with the delivery server 10, for example. The RAM 212 is used as a memory area for loading the program, a work area for the loaded program or the like. The CPU 211 realizes various functions by processing the program loaded on the RAM 212. The HDD 214 records the programs, various data used by the programs, or the like.

The scanner 22 is hardware for reading image data from a manuscript. The printer 23 is hardware for printing the image data on a printing paper. The modem 24 is hardware for connecting to a telecommunication line and is used for sending and receiving the image data with fax communication. The operation panel 25 is hardware provided with an input means for receiving an input from a user and a display means such as a liquid crystal panel. The network interface card 26 is hardware for connecting the multifunction peripheral 20 to a network (regardless of wired or wireless) such as a LAN. The SD card slot 27 is used to read the program recorded in the SD card 80. Said differently, not only the program recorded in the ROM 213 but also the program recorded in the SD card are loaded into the RAM 212 and executed in the multifunction peripheral 20.

Figure 5:
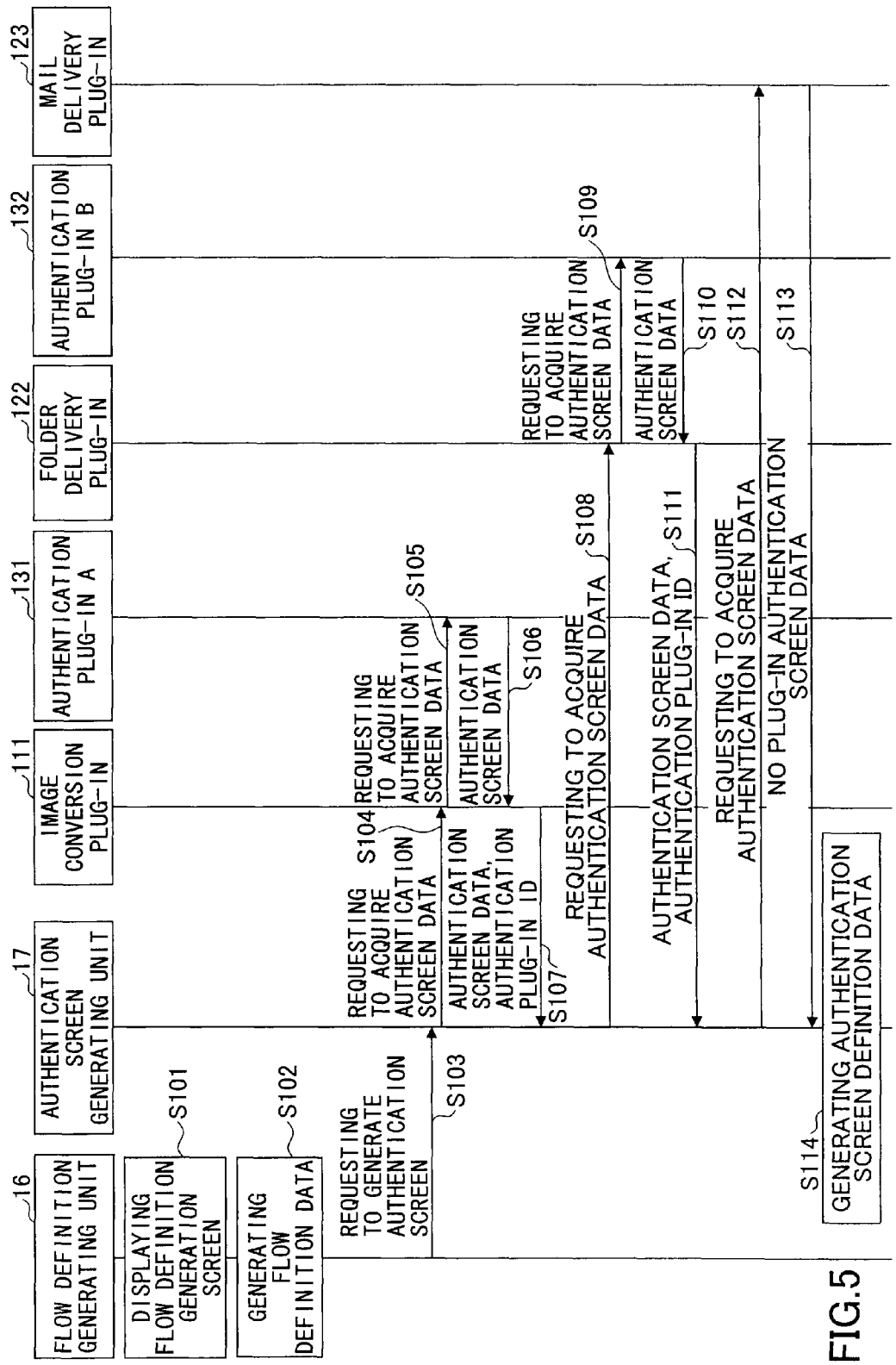
FIG. 5 is a sequence diagram explaining a procedure of the delivery server when flow definition is generated.

Next, the procedure of the network delivery system 1 is described. FIG. 5 is a sequence diagram explaining the procedure of the delivery server when flow definition is generated.

In response to an instruction input by a user (e.g. system administrator) to the delivery server 10, the flow definition generating unit 16 displays a flow definition generating screen to the display unit 106 in step S101.

Figure 6:
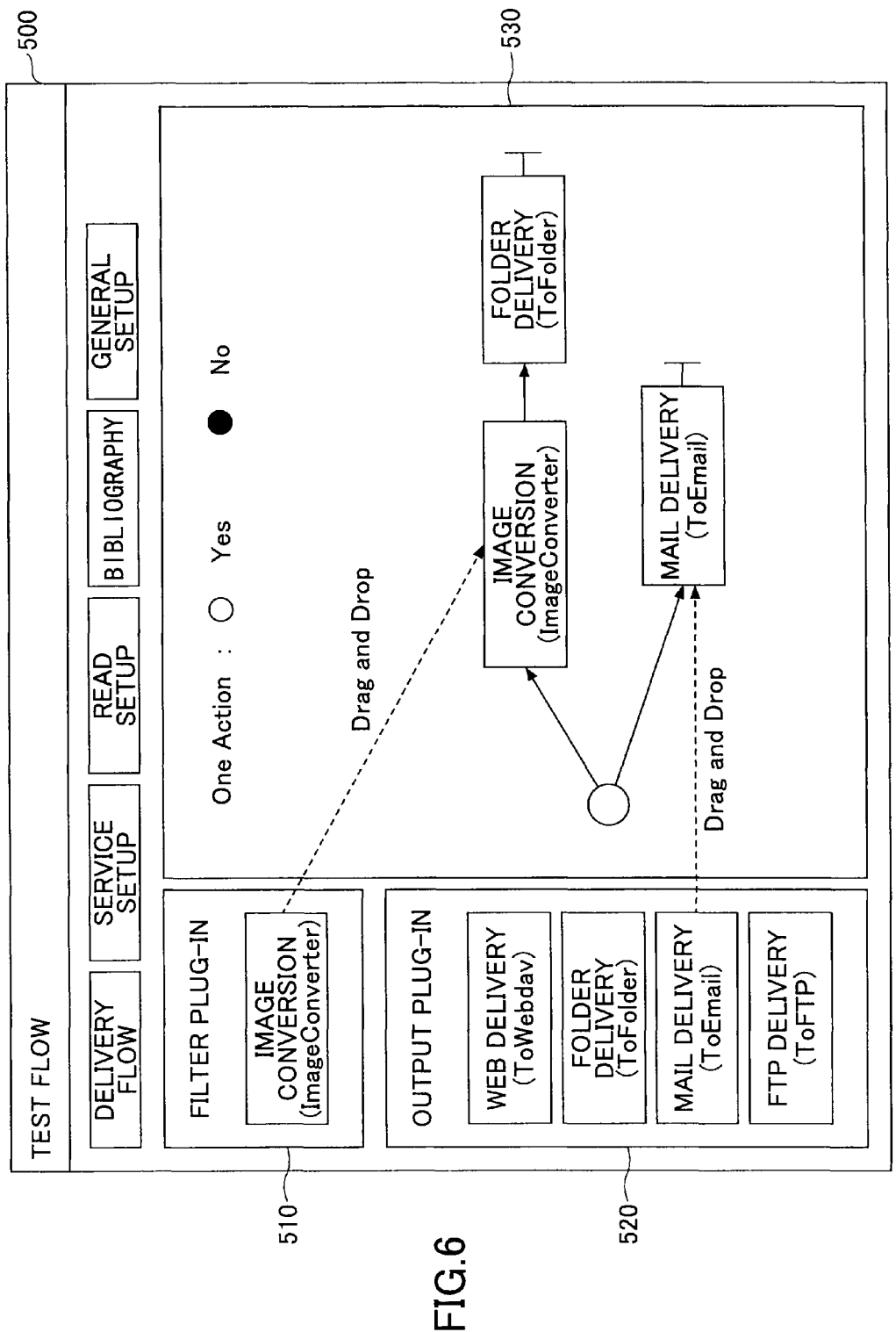
FIG. 6 is a display example of a flow definition generating screen.

FIG. 6 illustrates a display example of a flow definition generating screen. In FIG. 6, the flow definition generating screen 500 includes a filter plug-in list display area 510, an output plug-in display area 520, an edit area 530, or the like.

Buttons corresponding to the filter plug-ins 11 installed in the delivery server 10 are displayed on the filter plug-in list display area 510. Buttons corresponding to the output plug-ins 12 installed in the delivery server 10 are displayed on the output plug-in list display area 520.

The edit area 530 is an area for generating definition of the process flow. The user can define the process flow by disposing a button, present in the filter plug-in list display area 510 or the output plug-in list display area 520, at a predetermined position of the edit area 530 using drag and drop. FIG. 6 exemplifies a process flow defined so that the scanned image data are executed in two parallel paths. With the first path, the scanned image data are converted by the image conversion plug-in 111, and a result of the conversion is delivered by the folder delivery plug-in 123. With the second path, the scanned image data are delivered in a mail by the mail delivery plug-in 123. In the Embodiment, the "path" designates a processing route, through which a process flow can be tracked back to previous steps from an output plug-in 12 as a final destination of the process flow, i.e. from downstream to upstream. At least one path is included in one process flow.

A circle mark of ○, indicated at a starting point of the process flow on the edit area 530, designates a scanning process. Further, an arrow mark among the buttons corresponding to the plug-ins designate a sequential relationship among the plug-ins connected by the arrows.

Meanwhile, when the buttons put in the edit area 530 are clicked, the flow definition generating unit 16 displays a setup screen for the plug-in corresponding to the clicked button. The user can set a value to a parameter related to an execution condition of the plug-in via the setup screen. The value set up via the setup screen is recorded in the memory device 103 in association with each of the plug-ins.

When the user completes editing in the edit area 530 and clicks a storing button (not shown), the flow definition generating unit 16 generates the flow definition data 180 based on a content of the edit area 530 and stores the generated flow definition data 180 in the auxiliary storage device 102 in step S102.

FIG. 7 illustrates an example of the flow definition data. Referring to FIG. 7, the flow definition data 180 are described by an eXtensible Markup Language (XML), as an example. However, the flow definition data 180 may be described by another description format. The flow definition data 180 in FIG. 7 correspond to a content of an edit area 530.

The flow definition data 180 include a Distribution element surrounded by a <Distribution> tag as a root element. The Distribution element is an element corresponding to the process flow one-on-one, and includes the ID element and the Plugin element as a subelement.

The ID element has a flow ID value for identifying the various process flows. In the ID element 181, "TEST flow" is the flow ID. The flow ID is input by a user via a flow ID dialogue displayed before displaying, for example, the flow definition generating screen 500.

The Plugin element has information values related to the plug-in used in the process flow. The Plugin element which is a subelement of the Distribution element corresponds to a plug-in positioned at an end among the connected plug-ins. Referring to FIG. 6, the image conversion plug-in 111 and the mail delivery plug-in 123 are positioned at an end among the connected plug-ins. Referring to FIG. 7, the Plugin element 182 corresponding to an image conversion plug-in and a Plugin element 183 corresponding to a mail delivery plug-in 123 are defined as the subelement.

The Plugin element includes a Plug-in ID element, a Plug-in Type element, a Parameters element and so on, as the subelement.

The value of the Plugin element is an ID of the plug-in (plug-in ID). Said differently, the value "ImageConverter" of Plugin element which is the subelement of the Plugin element 182 designates the plug-in ID of the image conversion plug-in 111. Said differently, a value "ToEmail" of a Plugin element which is a subelement of the Plugin element 183 designates a plug-in ID of the mail delivery plug-in 123.

The value of the Plug-in Type element designates a type of the plug-in (the filter plug-in 11 or the output plug-in 12). "Filter" designates the filter plug-in 11, and "Output" designates the output plug-in 12.

The value of the Parameters element designates a setup value corresponding to a parameter forming an execution condition of the plug-in.

The Plugin element corresponding to the plug-in to which another plug-in is connected in a subsequent stage of the plug-in further includes a Next element. The next element includes a Plugin element corresponding to the plug-in in the subsequent stage as a subelement. Referring to FIG. 6, a folder delivery plug-in 122 is connected to the subsequent stage of the image conversion plug-in 111. Therefore, the Plugin element 182 includes the Next element, and the Next element includes the Plugin element corresponding to the folder delivery plug-in 122 as the subelement. Further, the Plugin element, i.e. a Plugin element having a Plugin element of a value "Output" as a subelement, of the output plug-in includes a required element. The value of the required element designates whether execution of the output plug-in is indispensable "true" or not "false". Referring to FIG. 7, the folder delivery plug-in 122, i.e. the Plugin element 184, is not indispensable and the mail delivery plug-in 123, i.e. the Plugin element 183, is indispensable. When the indispensable output plug-in 12 cannot be executed, for example, when authentication concerning the output plug-in 12 fails an entire process flow is not executed. On the other hand, when the output plug-in 12 is not executed, a process flow of executable parts except for the output plug-in 12 is executed. Although it is determined whether the output plug-in 12 is indispensable in Embodiment 1, indispensability of the filter plug-in 11 may be determined in a manner similar thereto.

When the flow definition data 180 are completely generated, the flow definition generating unit 16 requests the authentication screen generating unit 17 to generate an authentication screen in step S103 by designating a flow ID corresponding to the generated flow definition data 180. Subsequently, the authentication screen generating unit 17 refers to the flow definition data 180 corresponding to the designated flow ID, and acquires data (plug-in authentication data) indicative of authentication screen information corresponding to the plug-in out of the various plug-ins used in the process flow defined in the flow definition data 180.

In the Embodiment, it is required of the image conversion plug-in 111 to acquire the plug-in authentication screen data based on the Plugin element 182 in step S104. The image conversion plug-in 111 requests the authentication plug-in A 131, which is the authentication plug-in A 131 related to the image conversion plug-in 111, to acquire the plug-in authentication screen data upon the request in step S105. The authentication plug-in A 131 returns the plug-in authentication screen data including screen information for inputting the authentication information item necessary for the authentication process executed by the authentication plug-in A 131 to the image conversion plug-in 111 in step S106. The plug-in authentication screen data may be previously stored in the auxiliary storage device 102 in association with the authentication plug-ins 13, or may be generated by the various authentication plug-ins 13 when the plug-in authentication screen data are required in step S104. The image conversion plug-in 111 returns the plug-in authentication screen data, returned from the authentication plug-in A 131, to the authentication screen generating unit 17 in step S107, as the plug-in authentication screen data corresponding to the image conversion plug-in 111. Further, the image conversion plug-in 111 returns an ID (authentication plug-in ID) of the authentication plug-in A 131 corresponding to the authentication screen data generating unit 17 in step S107.

FIG. 8 illustrates an example of plug-in authentication screen data corresponding to the image conversion plug-in in the Embodiment, as an example. FIG. 8 illustrates a case where the plug-in authentication screen data are described by an XML. However, the plug-in authentication screen data may be described using other description formats.

Display information for making an authentication screen display or the like is defined in the plug-in authentication screen data by each authentication information item, used in authentication of the corresponding plug-in. The plug-in authentication screen data 610 illustrated in FIG. 8 include display information related to two authentication information items of Option 1 and Option 2, which are used in the authentication process with the authentication plug-in A 131 or the like. Here, the name "OptionN" is used for the purpose of convenience.

The description 611 is a definition related to Option 1 and the description 612 is a definition related to Option 2. The description 611 and the description 612 include a Label element and an EditBox element, respectively.

The Label element is a definition related to a level of the authentication information item. The Label element includes an id attribute and a label attribute. A value of the id attribute is an ID of the label. The value of the label attribute is a character string displayed on the label.

The Edit Box element is a definition related to a display part (edit box) for inputting a value of the authentication information item for receiving the value of the authentication information item. The EditBox element includes the id attribute and the required attribute. A value of the id attribute is an ID of the edit box. The value of the required attribute designates whether an input to the edit box is indispensable (true) or not (false).

The EditBox element further includes a parameterID element and a value element as subelements. A value of the parameterID element designates an ID (authentication information item ID) for identifying an authentication information item corresponding to the edit box. The value element is an initial value of an input value into the edit box. The value element is not defined for the edit box without an initial value.

Next, the authentication screen generating unit 17 requests the folder delivery plug-in 122 for acquisition of plug-in authentication screen data based on the Plug-in element 184 in step S108. The folder delivery plug-in 122 requests the authentication plug-in B 132, which is the authentication plug-in 13 related to the folder delivery plug-in 122, to acquire the plug-in authentication screen data upon the request in step S109. The authentication plug-in B 132 returns the plug-in authentication screen data including screen information for inputting the authentication information item necessary for the authentication process executed by the authentication plug-in B 132 to the folder delivery plug-in 122 in step S110. The folder delivery plug-in 122 returns plug-in authentication screen data returned from the authentication plug-in B 132 to the authentication screen generating unit 17 as the plug-in authentication screen data corresponding to the folder delivery plug-in 122 in step S111. Further, the folder delivery plug-in 122 returns an authentication plug-in ID of the authentication plug-in B 132 corresponding to the authentication screen data to the authentication screen data generating unit 17 in step S111.

FIG. 9 illustrates an example of the plug-in authentication screen data corresponding to folder delivery plug-in in the Embodiment.

The plug-in authentication screen data 620 illustrated in FIG. 8 include display information related to two authentication information items of Option 3 and Option 4, which are used in the authentication process with the authentication plug-in B 132 or the like. The description 621 is a definition related to Option 3, and the description 622 is a definition related to Option 4.

The description 621 includes the Label element and the ComboBox element. The Label element is as described in FIG. 8. The ComboBox element is a definition related to a display part (combo box) for selecting a value of the authentication information item.

The ComboBox element includes the id attribute, the required attribute, a viewableItemNum attribute or the like. A value of the id attribute is an ID of the combo box. A value of the required attribute designates whether a selection in the combo box is indispensable (true) or not (false). The ComboBox element further includes the parameterID element and the Data element as subelements. A value of the parameterID element designates an authentication information item ID of an authentication information item corresponding to the combo box. The Data element is a definition related to a choice (i.e. selection item) of the combo box and includes an item element by each selection item as subelements. Values of the selection items are defined as values of the Value elements in each of the item elements.

When the display parts other than the label, the edit box and the combo box are used, it is sufficient to define the element corresponding to the display part in the plug-in authentication screen data.

Next, the authentication screen generating unit 17 requests the mail delivery plug-in 123 of acquisition of the plug-in authentication screen data based on the Plugin element 183 in step S112. In the Embodiment, there is no authentication plug-in 13 in association with the mail delivery plug-in 123. Therefore, the mail delivery plug-in 123 responds to indicate that there are no plug-in authentication screen data in step S113.

Next, the authentication screen generating unit 17 integrates authentication screen data acquired from the plug-ins, the authentication plug-in ID or the like, to thereby generate the authentication screen definition data 190 in step S114. In the Embodiment, the authentication screen definition data 190 for displaying the authentication screen illustrated in FIG. 10 are generated.

Figure 10:
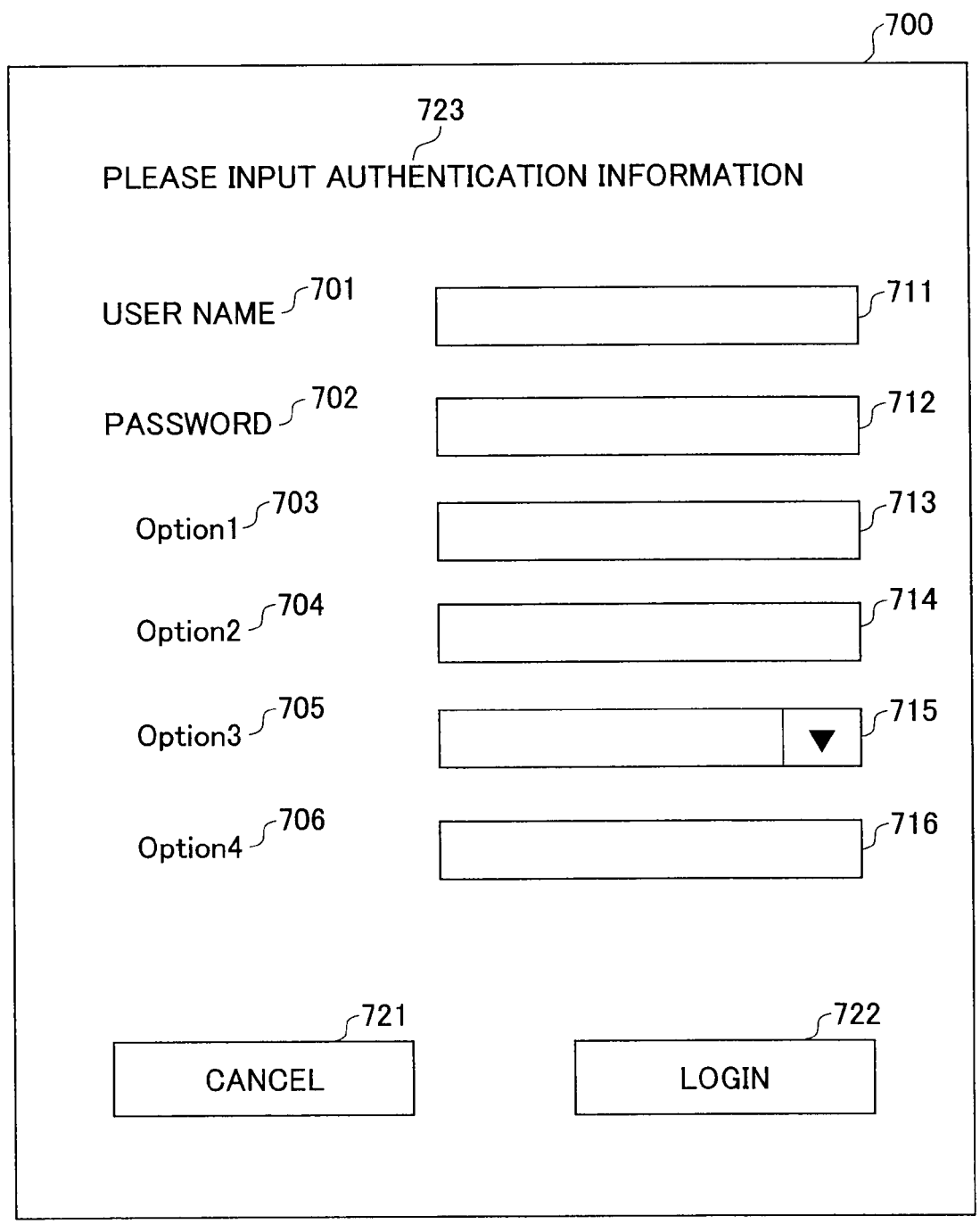
FIG. 10 illustrates a display example of an authentication screen in the Embodiment.

FIG. 10 illustrates a display example of the authentication screen in the Embodiment. Referring to FIG. 10, the authentication screen 700 includes labels 701 thru 706, edit boxes 711 thru 714 and 716, a combo box 715, a cancel button 721, a login button 722, a label 723 or the like.

The label 701 and the edit box 711 are display parts corresponding to a user name, which is one of the authentication information items. The label 702 and the edit box 712 are the display parts corresponding to a password, which is one of the authentication information items. The label 703 and the edit box 713 are the display parts corresponding to Option1, which is one of the authentication information items. The label 704 and the edit box 714 are the display parts corresponding to Option2, which is one of the authentication information items. The label 705 and the edit box 715 are the display parts corresponding to Option3, which is one of the authentication information items. The label 706 and the edit box 716 are the display parts corresponding to Option4, which is one of the authentication information items.

The authentication screen definition data 190 for displaying the authentication screen 700, i.e. the authentication screen definition data 190 generated in step S114, may be defined as illustrated in FIGS. 11 and 12.

FIGS. 11 and 12 illustrate an example of the authentication screen definition data in the Embodiment. An example of a single content of the authentication screen definition data 190 is illustrated throughout FIGS. 11 and 12. Said differently, FIG. 11 is followed by FIG. 12 in explaining the example of the content of the authentication screen.

The authentication screen definition data 190 include a window element surrounded by a <window> tag as the root element and an authentication element 1950 (vide FIG. 12) surrounded by an <authentication> tag.

The window element is a definition mainly relating to a display content of the authentication screen 700. Specifically, the window element includes a part element by each display part as the subelements. One of the part elements is a definition relating to one of the display parts. Referring to FIGS. 11 and 12, the lowest two digits of numerical references of the parts elements are the same as the lowest two digits of numerical references of the corresponding display parts in FIG. 10.

The parts elements include as common attributes, a type attribute, an id attribute, an X attribute, a Y attribute, a width attribute and a height attribute. The value of the type attribute indicate types of the display parts such as Label, EditBox, ComboBox or Button. The value of the id attribute indicates an ID of the display part. The values of the X attribute and the Y attribute designate an X coordinate value and a Y coordinate value at the left top corner on the authentication screen 700. The value of the width attribute and the value of the height attribute indicate a width and a height of the display part.

The part elements corresponding to the labels, i.e. the part elements 1901 thru 1906 and 1923 having values of the type attributes of "Label" have the label attributes in addition to the common attributes. The values of the label attributes are character strings displayed on the labels.

Further, the part elements corresponding to the display parts receiving the values of the authentication information items such as the edit box and the combo box have the required attribute and includes the parameterID element as the subelements. The value of the required attribute designates whether the inputs of the values are indispensable (true) or not (false). The values of the paramaterID elements indicate the authentication information item IDs corresponding to the display parts.

The part element corresponding to the combo box includes the item element. A content of the item element is the same as the content of the item element of the plug-in authentication screen data.

The part elements corresponding to buttons (i.e. the part elements 1921 and 1922 having values of the type attributes of "Button") include action elements as the subelements. The action elements are definitions related to processes which should be executed when the display parts are operated.

Meanwhile, the authentication element 1950 is a definition related to the authentication plug-in 13, which executes the authentication process based on the authentication information input to the authentication screen definition data 190. Specifically, the authentication elements 1950 include a Plugin element by each one of the authentication plug-ins 13. Each of the Plugin elements includes the id attribute and the required attribute. The value of the id attribute indicates the authentication plug-in ID. The "authA" is the authentication plug-in ID of the authentication plug-in A 131. The "authB" is the authentication plug-in ID of the authentication plug-in B 132 The value of the required attribute indicates whether the plug-in related to the authentication plug-in 13, which is identified by the authentication plug-in ID of the id attribute, is an indispensable plug-in or not. The authentication plug-in ID returned in a response (S107, S111 or the like) from the plug-ins (the image conversion plug-in 111, the folder delivery plug-in 122 or the like) to the authentication screen generating unit 17 is recorded as the value of the id attribute. The value of the required element, which is the subelement of the Plugin element in the flow definition data 180 of the plug-in (the image conversion plug-in 111 and the folder delivery plug-in 122) on a responding side, is recorded as the value of the required attribute.

Meanwhile, the part elements 1903 thru 1906, the part elements 1913 thru 1916, and the authentication element 1950 (hereinafter, referred to as an expanded definition part) are generated based on information (plug-in authentication screen data or the like) collected by the authentication screen generating unit 17 via the image conversion plug-in 111 and the folder delivery plug-in 122. Said differently, the expanded definition part is a part which changes its definition content in response to the process flow.

Meanwhile, parts (hereinafter, referred to as basic definition part) other than the expanded definition part are included in all authentication screen data, which are generated by the authentication screen generating unit 17, in common with all authentication screen data. Here, the basic definition part includes the part elements corresponding to the user name and the password. In the Embodiment, the user name and the password are the authentication information item which is input to any of the process flows. The basic definition part may be previously stored in a file as a template of the authentication screen definition data 190 and may be coded with hard coding in the authentication screen generating unit 17.

The authentication screen definition data 190 are stored in the auxiliary storage device 102 in association with the process flow (flow definition data 180). In the Embodiment, the association of the authentication screen definition data 190 with the process flow is done by giving a flow ID to the file name of the authentication screen definition data 190. However, the association can be done with another method. For example, information which can identify the flow definition data 180 may be described in the authentication screen definition data 190.

As described, the flow definition data 180 and the authentication screen definition data 190 can be generated. Therefore, the process flow can be executed. Next, the procedure of executing the process flow is described.

FIG. 13 is a sequence diagram explaining the procedure of executing a process flow.

In step S201, the delivery application (hereinafter, referred to as "delivery application") is activated in a multifunction peripheral 20 in response to a predetermined instructing input, which is input by a user from an operation panel 25 of the multifunction peripheral 20. When the delivery application is activated, the delivery application sends a sending request of the flow selection screen data to the delivery server 10 in step S202. Identification information (e.g. IP address) for identifying the delivery server 10 in the network 62 is recorded on an HDD 214 of the multifunction peripheral 20.

The flow selection screen generating unit 18 of the delivery server 10 generates flow selection screen data upon receipt of the sending request of the flow selection screen data, and sends it back to a delivery application in step S203. The flow selection screen generating unit 18 acquires a flow ID from the flow definition data 180, which are generated in the auxiliary storage device 102 of the delivery server 10, and generates the flow selection screen data so that a list of the flow IDs can be selectable as the choice. The flow selection screen data may be previously generated. For example, the flow selection screen data may be generated before or after the generation of the authentication screen definition data 190.

Subsequently, the delivery application makes the flow selection screen on the operation panel 25 based on the flow selection screen data when the delivery application receives the flow selection screen data in step S204.

Figure 14:
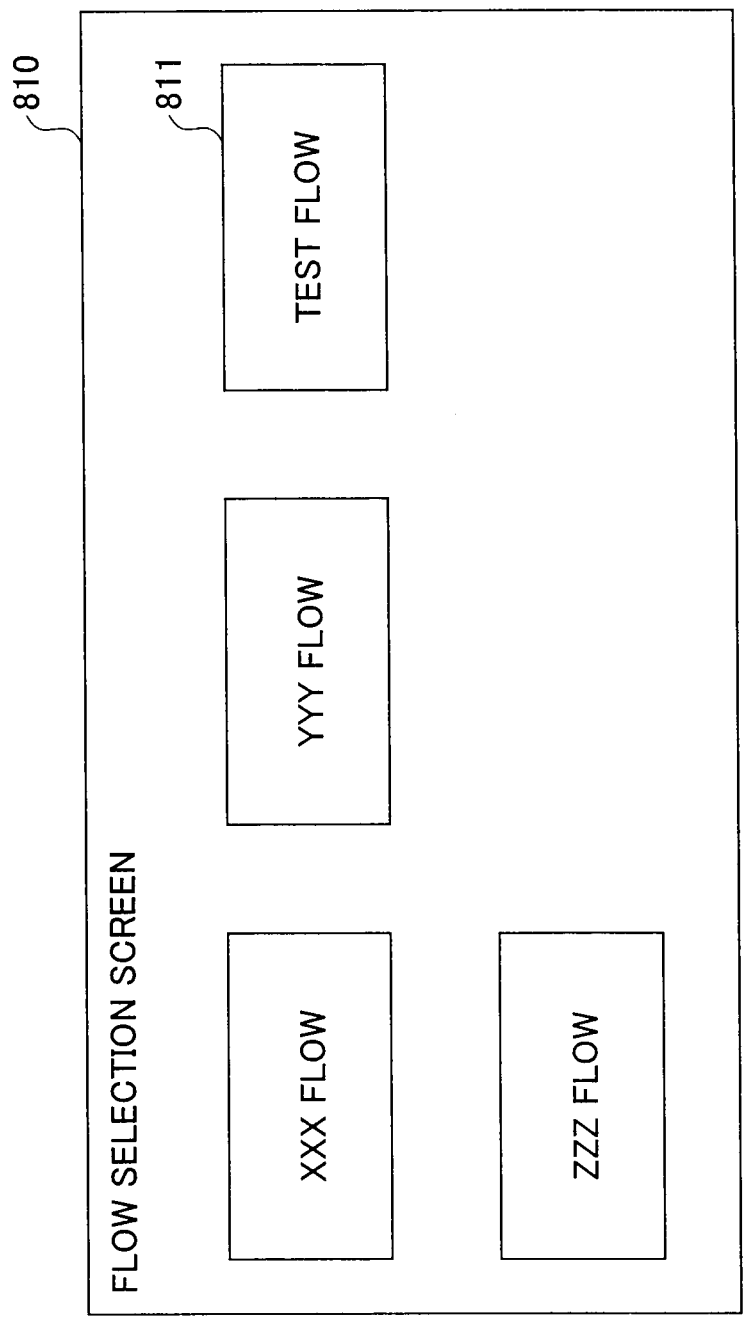
FIG. 14 is a display example of a flow selection screen.

FIG. 14 is a display example of the flow selection screen. Referring to FIG. 14, a button having a flow ID as a label is displayed by each of executable process flows on a flow selection screen 810. The executable process flows are determined by defining the flow definition data 180.

Subsequently, when the button on the flow selection screen is turned on by the user, the delivery application recognizes a flow ID allocated to the turned-on button as a flow ID of the process flow subject to execution in step S205. Here, the explanation is given on the premise that the button 811 is turned on. Therefore, the flow ID subject to the execution (hereinafter referred to as "current flow") is "TEST flow". Subsequently, the delivery application sends the current flow ID to the delivery server 10 in step S206.

When the current flow ID is received by the delivery server 10, the authentication controlling unit 15 searches the authentication screen definition data 190 from the auxiliary storage device 102 in step S207. The authentication controlling unit 15 records the current flow ID as a flow ID of the process flow subject to execution in the memory device 103. When the authentication screen definition data 190 are successfully searched, the authentication controlling unit 15 sends the authentication screen definition data 190 to the delivery application in step S208.

When the delivery application receives the authentication screen definition data, the delivery application displays the authentication screen 700 (vide FIG. 10) on the operation screen based on the authentication screen definition data 190 in step S209. Subsequently, the user inputs the value of the authentication information item via the authentication screen 700 in step S210. It is possible to input not only the value of default authentication information item (user name and password) but also a value of the authentication information item (Option1 thru Option4) for the plug-in used in the process flow subject to the execution to the authentication screen 700. Therefore, the user can input the values of all the authentication information items which are required to input in the process flow subject to the execution from the authentication screen 700.

When the value of the authentication information item is input via the authentication screen 700 and a login button 722 is turned on, the delivery application sends the authentication information to the delivery server 10 in step S211.

FIG. 15 illustrates a structural example of the authentication information. As illustrated in FIG. 15, the authentication information includes the authentication information item ID and the input value by each of the authentication information items. The delivery application identifies the authentication information item ID of the authentication information items based on the parameterID element included in the authentication screen definition data 190. The input value input via the authentication screen 700 is included in the authentication information as is.

Subsequently, when the delivery information is received by the delivery server 10, the authentication controlling unit 15 controls execution of the authentication process based on the authentication information in step S212. When the authentication process ends, the authentication controlling unit 15 returns the result of the authentication to the delivery application in step S213. The delivery application displays error information indicating failure of the authentication on the operation panel 25 and stops the process when the received result of the authentication indicates failure of the authentication. On the other hand, when the received result of the authentication indicates the success of the authentication, the authentication application causes the scanner 22 to execute reading of a manuscript in step S214. The manuscript may be placed in the scanner before activating the delivery application or after success of the authentication.

Subsequently, the delivery application sends the image data read from the manuscript (scanned image data) to the delivery server 10 in step S215. When the scanned image data are received by the delivery server 10, the flow process controlling unit 14 acquires the flow definition data 180 corresponding to the current flow ID recorded in the memory device 103, and controls execution of the flow process defined in the flow definition data 180 in step S216. By executing the flow process, the delivery process of the scanned image data is executed.

Figure 16:
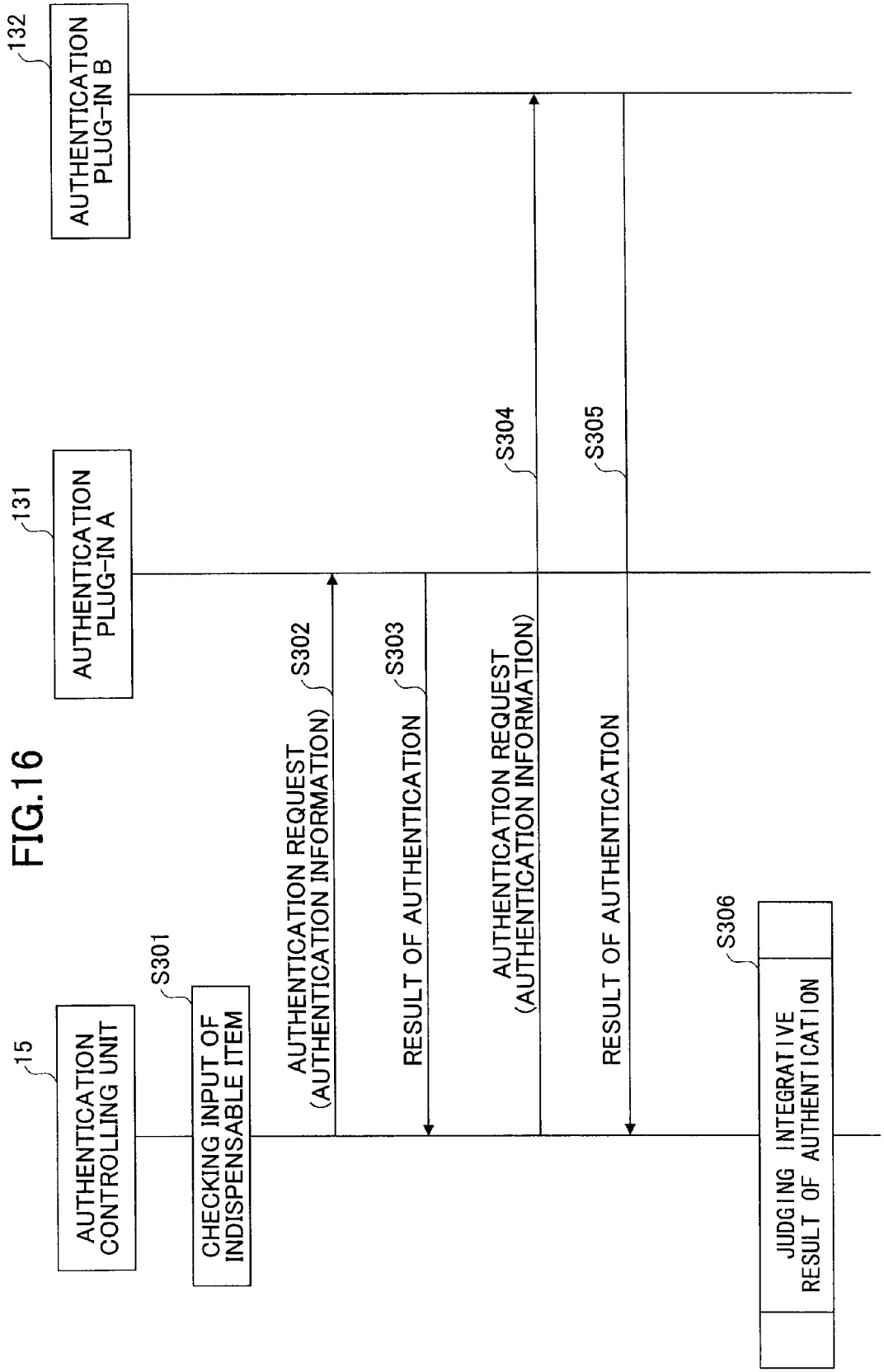
FIG. 16 is a sequence diagram explaining a procedure of an authentication process.

Next, step S212 is described in detail. FIG. 16 is a sequence diagram explaining the procedure of the authentication process.

In step S301, the authentication controlling unit 15 determines whether the value of the authentication information item indispensable for the received authentication information is input (whether the input value is vacant or not) in step S301. The judgment is carried out by acquiring the value of the required attribute corresponding to the authentication information item IDs of the authentication information from the authentication screen definition data 190. When there is the indispensable authentication information item without the value input to it, the authentication controlling unit 15 returns the result of the authentication to the delivery application. In this case, the delivery application launches the authentication screen 700 on the operation panel 25 and enables the inputting of the value of the indispensable authentication information item.

When the values are input for all indispensable authentication information items, the authentication controlling unit 15 determines the authentication plug-ins 13 associated with the plug-ins used in the process flow subject to execution based on the authentication element 1950, and causes the authentication plug-ins 13 to execute the authentication process.

In the Embodiment, the authentication controlling unit 15 requests, based on the id attribute of the Plugin element 1951 in the authentication element 1950, the authentication plug-in A 131 to execute, based on the authentication information, the authentication process in step S302. The authentication plug-in A 131 executes the authentication process based on the authentication process, and returns the result (whether the authentication is successful) of the authentication to the authentication controlling unit 19 in step S303. The authentication controlling unit 19 records the result of the authentication by the authentication plug-in A 131 in the memory device 103 in association with the authentication plug-in ID of the authentication plug-in A 131. The content of the authentication process and an occasion in which the authentication is succeeded or failed depends on implementation of the authentication plug-in 13. Further, all of the authentication information may be input in the authentication plug-ins 13 or only a part related to the indispensable authentication information item may be input.

Subsequently, the authentication controlling unit 15 requests, based on the id attribute of the Plugin element 1952 in the authentication element 1950, the authentication plug-in B 132 to execute, based on the authentication information, the authentication process in step S304. The authentication plug-in B 132 executes the authentication process based on the authentication process, and returns the result (whether the authentication is successful) of the authentication to the authentication controlling unit 19 in step S305. The authentication controlling unit 19 records the result of the authentication by the authentication plug-in B 132 in the memory device 103 of the authentication plug-in B 132 in association with the authentication plug-in ID of the authentication plug-in B 132.

Subsequently, the authentication controlling unit 15 determines the integrative or comprehensive result of judgment (the result of the authentication process as a whole) based on the result of the authentication by the authentication plug-ins 13 recorded in the memory device 103 in step S306. The result of the integrative authentication is returned to the delivery application in step S213 of FIG. 13.

Figure 17:
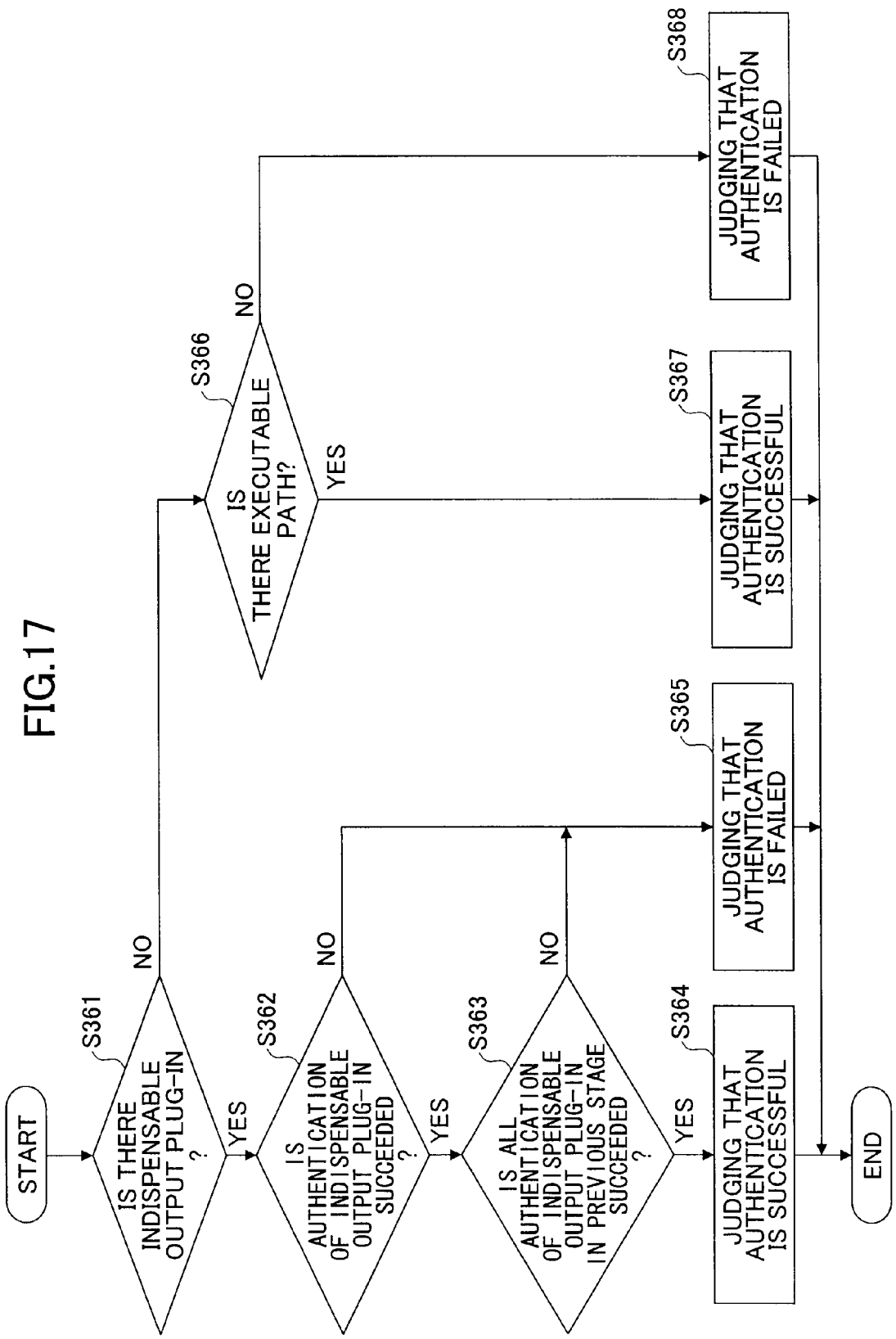
FIG. 17 is a flowchart explaining a procedure of a determination process of an integrative result of the authentication with an authentication controlling unit.

Next, step S306 of FIG. 16 is described in detail. FIG. 17 is a flowchart explaining a procedure of a determination process of the integrative result of the authentication with an authentication controlling unit.

In step S361, the authentication controlling unit 15 determines whether the output plug-in 12 indispensable to the process flow exists, based on the values of the required attributes of the Plugin elements in the authentication elements of the authentication screen definition data 190. When there is the indispensable output plug-in 12 in YES of step S361, the authentication controlling unit 15 determines whether the authentication for the output plug-in 12 is successful, based on the result of the authentication recorded in the memory device 103 in association with each of the authentication plug-in IDs in step S362. When the authentication for the indispensable output plug-in 12 is successful in YES of step S362, the authentication controlling unit 15 determines whether the authentication for all the plug-ins connected to the previous step is successful or not in the process flow, based on the result of the authentication recorded in the memory device 103 in step S363. The plug-in of the previous stage of the indispensable output plug-in 12 is determined based on the flow definition data 180. When the authentication for all of the plug-ins connected to the previous stage of the indispensable output plug-in 12 is successful including a case where there is no plug-in in the previous stage of the indispensable output plug-in 12 in YES of step S363, the authentication controlling unit 15 determines that the integrative result of the authentication is successful in step S364.

On the other hand, when the authentication for the output plug-in 12 is failed in NO of step S362, the authentication controlling unit 15 determines that the integrative result of the authentication is failed in step S365.

Further, when there is no indispensable output plug-in 12 in NO of step S361, the authentication controlling unit 15 determines whether there exists at least one executable path or not in the process flow in step S366. Here, the executable path is a path to which only plug-ins successfully authorized or plug-ins unnecessary to be authorized belong, said differently a path in which the authentication for all the plug-ins requiring the authentication is successful. When there is the executable path in YES of step S366, the authentication controlling unit 15 determines that the integrated result of the authentication is successful in step S367. When there is no executable path in NO of step S366, the authentication controlling unit 15 determines that the integrated result of the authentication is failed in step S368.

Next, specific examples of FIG. 17 is explained. FIG. 18 illustrates specific examples of the integrative results of the authentication.

The tables in FIG. 18 are specific examples of the integrative results of the authentication. Reference signs A, B and C in the first columns of the tables designate identifiers for plug-ins used in the process flow. The reference sign A designates an image conversion plug-in 111, the reference sign B designates a filter delivery plug-in 111, and the reference sign C designates a mail delivery plug-in 123. The structure of the process flow is as illustrated in FIG. 6. Referring only to FIG. 17, the authentication plug-in 13 is associated with the mail delivery plug-in 123. The plug-ins of which identifiers are surrounded by rectangles are output plug-ins.

Indication of OK or NG in the second columns indicates success or failure of the authentication by each plug-in. The third columns indicate the integrative results of the authentication.

In FIG. 18, cases (1) thru (10) are illustrated. In case (1), since the all results of the authentication are failures (no good: NG) as NO in step S366, the integrative results of the authentication are determined to be NG.

In cases (2) and (5), since the result of the authentication for the indispensable reference sign B is NG as NO in step S362, the integrative result of the authentication is determined to be NG. In cases (3) and (8), since the result of the authentication for the indispensable reference sign A is NG as NO in step S363, the integrative result of the authentication is determined to be NG. In case (4), since the result of the authentication for the indispensable reference sign B and the result of the authentication for the reference sign A in the previous stage of the reference sign B are OK as YES in step S363, the integrative result of the authentication is determined to be NG.

In case (6), since the result of the authentication for the indispensable reference sign C is OK as YES in step S362 and there is no plug-in in the previous stage of the indispensable reference sign C as YES in step S363, the integrative result of the authentication of the authentication is determined to be OK. In case (7), since the path formed by the reference sign C can be executable in YES of S366, the integrative result of the authentication is determined to be OK. In case (9), since the result of the authentication for the indispensable sign C is NG as NO in step S362, the integrative result of the authentication is determined to be NG. In case (10), since the results of the authentication for all the plug-ins are OK, and all the paths can be executed in YES of step S366, the integrative result of the authentication is determined to be OK.

Figure 19:
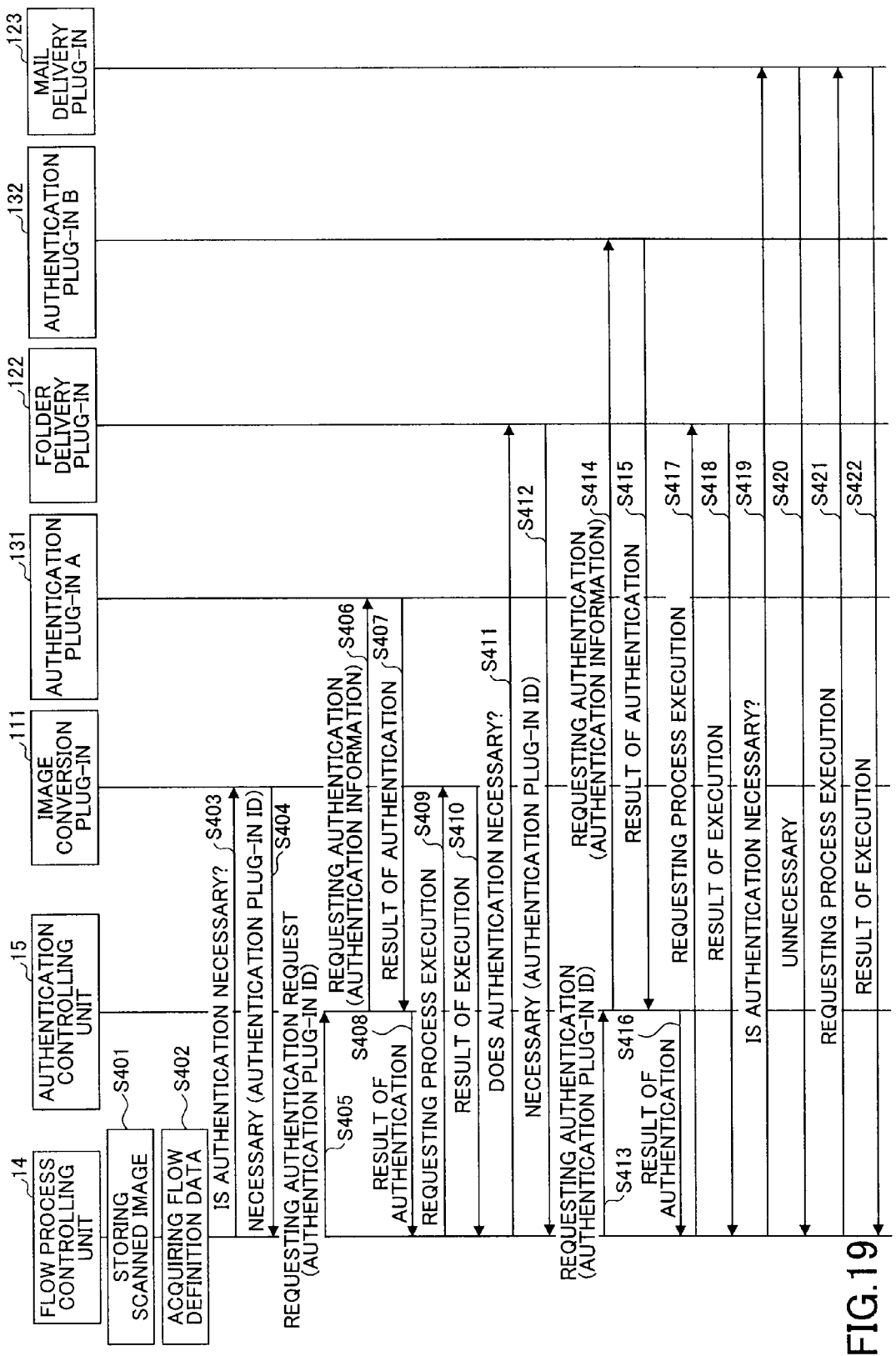
FIG. 19 is a sequence diagram explaining a procedure of executing the process flow.

Next, step S216 of FIG. 13 is described in detail. FIG. 19 is a sequence diagram explaining a procedure of executing the process flow.

In step S401, the flow process controlling unit 14 stores the scanned image data, which is received in step S215, in the auxiliary storage device 102. Subsequently, the flow process controlling unit 14 acquires flow definition data 180 corresponding to the current flow recorded in the memory device 103 from the auxiliary storage device 102 in step S402. Here, the flow definition data 180 illustrated in FIG. 7 are acquired.

Subsequently, the low process controlling unit 14 inquires the image conversion plug-in 111 of whether the authentication is necessary or not, e.g. whether the authentication plug-in 13 is associated or not, based on the Plugin element 182 of the flow definition data 180 in step S403. In the Embodiment, the authentication plug-in A 131 is associated with the image conversion plug-in 111. Therefore, the image conversion plug-in 111 responds to the flow process controlling unit 14 to report necessity of the authentication and send an authentication plug-in ID of the authentication plug-in A131 in step S404.

In response to the response that the authentication is necessary, the flow process controlling unit 14 requests the authentication controlling unit 15 to execute the authentication by designating the responded authentication plug-in ID in step S405. The authentication controlling unit 15 designates the authentication information, i.e. the authentication information illustrated in FIG. 15 received in step S211, which is stored in the memory device 103, and requests the execution of the authentication of the authentication plug-in A 131 identified by the authentication plug-in ID in step S406. The authentication plug-in A 131 executes the authentication process using the authentication information, and returns the result of the authentication to the authentication controlling unit 15 in step S407. The authentication controlling unit 15 returns the result of the authentication to the flow process controlling unit 14 is step S408.

When the authentication succeeds, the flow process controlling unit 14 requests the image conversion plug-in 111 to execute the process by designating the identification information, for example, file name of the scanned image data in step S409. The image conversion plug-in 111 converts an image of the scanned image data based on the designated identification information, and stores the generated data in the auxiliary storage device 102. The image conversion plug-in 111 returns the identification information of the generated data, for example, a file name to the flow process controlling unit 14 in step S410.

Subsequently, the flow process controlling unit 14 inquires whether the authentication is necessary or not of the folder delivery plug-in 122, based on the Plugin element 184 of the flow definition data 180. In the Embodiment, the authentication plug-in B 132 is associated with the folder delivery plug-in 122. Therefore, the folder delivery plug-in 122 responds to the flow process controlling unit 14 to report necessity of the authentication and send an authentication plug-in ID of the authentication plug-in B132 in step S412.

In response to the response that the authentication is necessary, the flow process controlling unit 14 requests the authentication controlling unit 15 to execute the authentication by designating the responded authentication plug-in ID in step S413. The authentication controlling unit 15 designates the authentication information stored in the memory device 103, and requests the authentication plug-in B 132, identified by the authentication plug-in ID, to execute the authentication in step S414. The authentication plug-in B 132 executes the authentication process using the authentication information, and returns the result of the authentication to the authentication controlling unit 15 in step S415. The authentication controlling unit 15 returns the result of the authentication to the flow process controlling unit 14 in step S416.

When the authentication succeeds, the flow process controlling unit 14 requests the folder delivery plug-in 122 to execute the process by designating the identification information, for example, file name returned from the image conversion plug-in 111 in step S417. The folder delivery plug-in 122 executes the delivery process of the data of the designated identification information, and returns the result of the delivery process whether the delivery process is successful or failed to the flow process controlling unit 14 is step S418.

Subsequently, the flow process controlling unit 14 inquires whether the authentication is necessary or not of the mail delivery plug-in 123, based on the Plugin element 183 of the flow definition data 180 in step S419. In the Embodiment, the authentication plug-in 13 is not associated with the mail delivery plug-in 123. Therefore, the mail delivery plug-in 123 responds to the flow process controlling unit 14 to inform that the authentication is unnecessary in step S420.

In response to the response that the authentication is unnecessary, the flow process controlling unit 14 requests the image conversion plug-in 123 to execute the process by designating the identification information, for example, file name of the scanned image data in step S421. Here, the reason why the scanned image data are designated as a processing object is that the mail delivery plug-in 123 is a plug-in located at an end of the process flow in parallel with the image conversion plug-in 111.

Subsequently, the mail delivery plug-in 123 executes the mail delivery of the scanned image data, and returns the result of the delivery process to the flow process controlling unit 14 in step S422.

Meanwhile, when the authentication of the plug-in, for example, the image conversion plug-in 111 and the folder delivery plug-in 122 requiring the authentication is failed, the flow process controlling unit 14 stops to execute the plug-in and another plug-in belonging to the path, to which the plug-in belongs. Specifically, when the authentication of the image conversion plug-in 111 fails, not only the image conversion plug-in 111 but also the folder delivery plug-in 122 is not executed.

However, the plug-ins belonging to the other paths on the process flow are not excluded from the execution object. Therefore, when the authentication of the image conversion plug-in 111 fails, steps S407 thru S416 are not executed. However, steps S417 or later may be executed.

In this way, only the path that failed to authenticate is excluded from the execution object, and the entire process flow is not stopped. Thus, the process flow may be executed in a range usable by the user. Therefore, it is possible to make the execution of the process flow flexible.

Although an explanation has been provided about the example that the plug-in is executed by sequentially confirming the authentication in FIG. 19, it is also possible to instruct to execute the plug-in belonging to the executable path after first authenticating the plug-in requiring the authentication, determining the usable plug-ins and determining the executable paths.

Further, the usable plug-ins may be determined by using the results of the authentication in step S212. In this case, it is unnecessary to execute the authentication process in FIG. 19.

Further, although there has been explained such that the process of the mail delivery plug-in 123 is executed after the folder delivery plug-in 122 in FIG. 19, parallel paths in the process flow may be executed in parallel. Said differently, the process related to the mail delivery plug-in 123 may be executed in parallel with the process related to the image conversion plug-in 111.

As described, the delivery server 10 of the Embodiment generates the authentication screen definition data 190 of the integrative authentication screen, which enables to input the authentication information necessary for each plug-in from a single screen. Therefore, all the authentication information necessary for the process flow is input by a single input operation via the authentication screen. As a result, it is possible to suppress increment of input load of the authentication information by a user by enabling the authentication process by each plug-in.

It is possible for the information processing device to simplify an input operation of the authentication information related to the process flow, constructed by combining plural software components.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that various changes, substitutions, and alterations could be made thereto without departing from the spirit and scope of the invention.

This patent application is based on Japanese Priority Patent Application No. 2009-034263 filed on Feb. 17, 2009, the entire contents of which are hereby incorporated herein by reference.

What is claimed is:

1. An information processing system performing process flows, each process flow including plural processes, the information processing system comprising:
   a flow process controlling unit configured to detect whether authentication is necessary for each of the plural processes forming a process flow;
   an authentication controlling unit configured to acquire information used for authentication from each of the plural processes for which authentication is necessary; and
   an authentication screen generating unit configured to generate an authentication screen based on the acquired information, wherein
   the flow process controlling unit is configured to control performance of the process flow including the plural processes based on flow definition information, and
   the flow process controlling unit does not perform one or more of the processes for which authentication is necessary when the authentication of the one or more of the processes for which authentication is necessary based on an input value input to the authentication screen fails.

2. The information processing system according to claim 1, wherein the authentication screen generating unit integrates into the authentication screen the acquired information from each of the plural processes for which authentication is necessary.

3. The information processing system according to claim 1, wherein the authentication screen generating unit designates an input area in the authentication screen for information acquired from each of the plural processes for which authentication is necessary.

4. The information processing system according to claim 1, wherein the authentication screen generating unit outputs the generated authentication screen to a display device.

5. An information processing method for performing process flows, each process flow including plural processes, the information processing method comprising:
   detecting whether authentication is necessary for each of the plural processes forming a process flow;
   acquiring information used for authentication from each of the plural processes for which authentication is necessary;
   generating an authentication screen based on the acquired information; and
   controlling performance of the process flow including the plural processes based on flow definition information,
   wherein the controlling does not perform one or more of the processes for which authentication is necessary when the authentication of the one or more of the processes for which authentication is necessary based on an input value input to the authentication screen fails.

6. The information processing method according to claim 5, wherein the generating includes integrating into the authentication screen the acquired information from each of the plural processes for which authentication is necessary.

7. The information processing method according to claim 5, wherein the generating includes designating an input area in the authentication screen for information acquired from each of the plural processes for which authentication is necessary.

8. The information processing method according to claim 5, wherein the generating includes outputting the generated authentication screen to a display device.

9. A non-transitory computer-readable storage medium storing computer-readable instructions thereon, which, when executed by a computer, cause the computer to perform an information processing method for performing process flows, each process flow including plural processes, the information processing method comprising:
   detecting whether authentication is necessary for each of the plural processes forming a process flow;
   acquiring information used for authentication from each of the plural processes for which authentication is necessary;
   generating an authentication screen based on the acquired information; and
   controlling performance of the process flow including the plural processes based on flow definition information,
   wherein the controlling does not perform one or more of the processes for which authentication is necessary when the authentication of the one or more processes for which authentication is necessary based on an input value input to the authentication screen fails.

10. The non-transitory computer-readable storage medium according to claim 9, wherein the generating includes integrating into the authentication screen the acquired information from each of the plural processes for which authentication is necessary.

11. The non-transitory computer-readable storage medium according to claim 9, wherein the generating includes designating an input area in the authentication screen for information acquired from each of the plural processes for which authentication is necessary.

12. The non-transitory computer-readable storage medium according to claim 9, wherein the generating includes outputting the generated authentication screen to a display device.

* * * * *